United States Patent [19]

Hoare

[11] 4,051,155
[45] Sept. 27, 1977

[54] ANTHRAQUINONE DYES

[75] Inventor: Robert C. Hoare, Rabat, Morocco

[73] Assignee: Allied Chemical Corporation, Morris Township, N.J.

[21] Appl. No.: 640,677

[22] Filed: Dec. 15, 1975

[51] Int. Cl.² .......................... C09B 1/50; C07C 97/24
[52] U.S. Cl. .................................................. 260/379
[58] Field of Search ......................................... 260/379

[56] References Cited

U.S. PATENT DOCUMENTS

| | | | |
|---|---|---|---|
| 1,980,025 | 11/1934 | Woolfram et al. | 260/379 X |
| 3,235,322 | 2/1966 | Tanaka et al. | 260/379 X |
| 3,401,003 | 9/1968 | Boosen et al. | 260/379 X |
| 3,801,606 | 4/1974 | Bien et al. | 260/379 X |

Primary Examiner—Paul F. Shaver
Attorney, Agent, or Firm—J. P. Friedenson; A. J. Stewart; A. M. Doernberg

[57] ABSTRACT

Anthraquinone compounds having the formula:

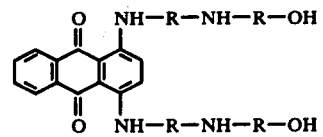

wherein R is alkylene of 1 to 4 carbon atoms, exhibit attractive blue shades and are useful in dyeing textiles.

2 Claims, No Drawings

ANTHRAQUINONE DYES

BACKGROUND OF THE INVENTION

Anthraquinone derivatives are known to possess properties which make them useful as dyes for, e.g., both natural and synthetic textiles. While a great number of anthraquinone-based dyes are known in the art, there is a constant effort to find new anthraquinone compounds for use in the dye field. For example, published Netherlands Application No. 66/06423 discloses blue anthraquinone dyes produced by reacting 1,4-diamino-anthraquinone with epichlorohydrin and condensing the resultant product with mono-, or diethanolamine. The dye produced is said to have the formula

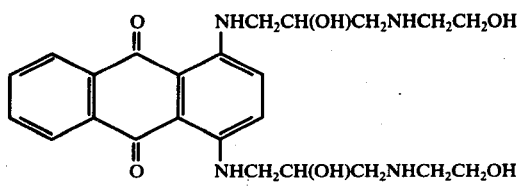

(See Chemical Abstracts, 1967, Vol. 66, page 76931n).

While this anthraquinone-based dye is indicated as useful for dyeing wool, the process required to produce the compound involves several steps. It is of course obvious that the fewer the steps required, the more desirable the product economically, especially if the product possess similar properties.

It is an object of this invention to provide an anthraquinone-based dye which may be produced by a relatively simple reaction.

It is the further object of this invention to provide a blue anthraquinone dye.

These and other objects will become apparent from the description which follows.

BRIEF DESCRIPTION OF THE INVENTION

In accordance with this invention there is provided anthraquinone dyes having the formula:

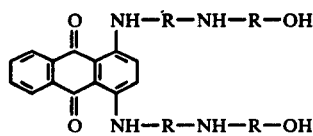

wherein R is alkylene of 1 to 4 carbon atoms. These dyes produced an attractive blue shade on textiles and can be produced by a relatively simple reaction mechanism. Particularly preferred are those dyes wherein R is ethylene.

DETAILED DESCRIPTION OF THE INVENTION

The anthraquinone dyes of this invention are produced by reacting about 2 moles of an N-aminoalkylalkanolamine with one mole of leuco quinizarine and oxidizing the resulting product with, e.g., air.

Leuco quinizarine, or 2,3-dihydro-1,4-dihydroxy anthraquinone has the formula:

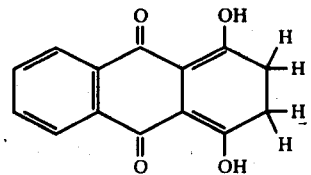

Reaction of 1 mole of this compound with 2 moles of an N-aminoalkylalkanolamine, followed by oxidation with an oxygen containing gas, such as air, results in a blue dye of the formula:

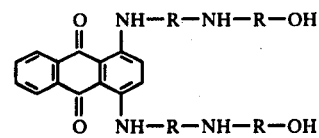

The N-aminoalkylalkanolamines useful in preparing the dyes of this invention are: N-aminomethylmethanolamine ($H_2NCH_2NHCH_2OH$), N-aminoethylethanolamine ($H_2NCH_2CH_2NHCH_2CH_2OH$), N-aminopropylpropanolamine ($H_2NCH_2CH_2CH_2NHCH_2CH_2CH_2OH$) and N-aminobutylbutanolamine ($H_2NCH_2CH_2CH_2CH_2NHCH_2CH_2CH_2CH_2OH$).

While the reaction mechanism requires 2 moles of N-aminoalkylalkanolamine per mole of leuco quinizarine, it is generally preferred to employ an excess, e.g., 2.5 to 3 moles of the N-aminoalkylalkanolamine to ensure formation of the desired product.

Conveniently, the compounds of this invention are prepared by dissolving the leuco quinizarine in a solvent, such as ethyl alcohol, charging the N-aminoalkylalkanolamine with agitation and heating to about 75°-80° C. for a time sufficient to allow the reaction to occur. Thereafter, oxygen is bubbled through the solution until the leuco product is oxidized. The solution is cooled to about 10° C., filtered, washed with alcohol and dried. The dyes of this invention may be applied to textiles by conventional dyeing procedures for disperse dyes, such as solvent emulsion dyeing.

It has been indicated above that the preferred compound in accordance with this invention is that in which R is ethylene, i.e., the compound

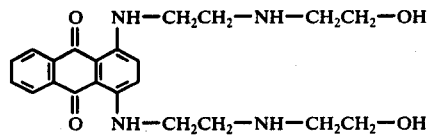

Not only is this compound useful as a blue dye but, in addition, it has been found, based on preliminary studies, that this compound has shown presumptive activity against leukemia in mice.

DESCRIPTION OF PREFERRED EMBODIMENT

A mixture of 300cc of ethyl alcohol and 121 grams of para leuco quinizarine was charged to a 1 liter flask. The mixture was agitated to form a uniform slurry, and to the slurry was charged 124 grams of N-aminoethylethanolamine. The resulting mixture was agitated at room temperature for one hour, heated to 75°-80° C. and held at that temperature for 6 hours. While the temperature was maintained at 75°-80° C., the mixture was aerated until the leuco product was oxidized as indicated by the product being completely in solution. The solution was cooled to 10° C., filtered, washed with ethyl alcohol and dried under vacuum. The yield was 138 grams of a blue dyestuff.

What is claimed is:

1. A compound having the formula

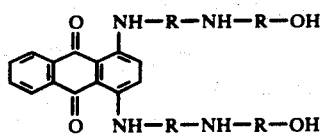

wherein R is alkylene of 1 to 4 carbon atoms.

2. A compound having the formula:

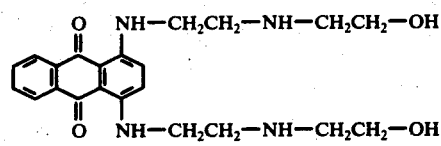

* * * * *